July 4, 1961

C. G. GUSTAVSSON 2,990,599

HOSE CLAMP

Filed Jan. 20, 1959

United States Patent Office 2,990,599
Patented July 4, 1961

2,990,599
HOSE CLAMP
Carl Georg Gustavsson, Sodertalje, Sweden, assignor to A.B. Mikro-Verktyg, Sodertalje, Sweden, a corporation of Sweden
Filed Jan. 20, 1959, Ser. No. 787,975
Claims priority, application Sweden Jan. 20, 1958
4 Claims. (Cl. 24—274)

This invention relates to a hose clamp of the type comprising a flexible metallic band or strip one end of which is fastened to a casing for a screw, said casing having a top part and a bottom part, and wherein the screw is adapted to engage thread-receiving helical recesses near the other end of the strip. In order to ensure reliable engagement between the screw and the thread-receiving recesses in the strip, the screw must have comparatively large threads with consequent great pitch. However, such a screw tends to lose its self-locking properties. Therefore, when the screw and the top and the bottom parts of the casing are assembled, an additional frictional resistance has to be provided to counteract turning of the screw. This in turn results in that the screw will exert such a great resistance to the tightening movement that the screw sometimes cannot be turned by means of an ordinary screw driver, in which case the operator may feel tempted to use tools permitting the application of great torques which may cause the head of the screw to be cracked or broken from the screw.

The object of the invention is to provide an improved hose clamp of the type referred to in which the frictional resistance to the turning of the screw can be given a suitable value which does not substantially vary in the individual clamps manufactured by mass production. The invention consists in the construction and arrangement of parts as hereinafter described, by way of example, with reference to the accompanying drawing.

Figure 1:
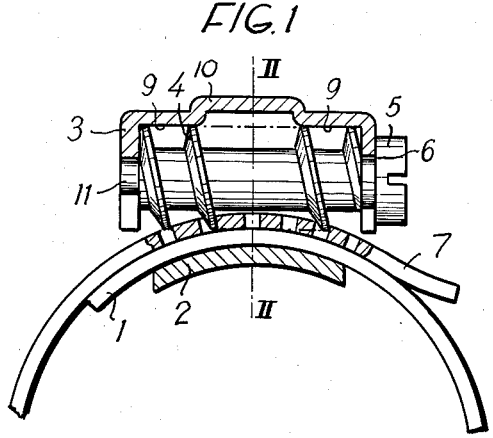
Figure 2:
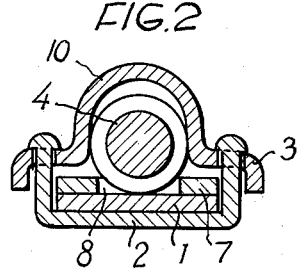
Figure 3:
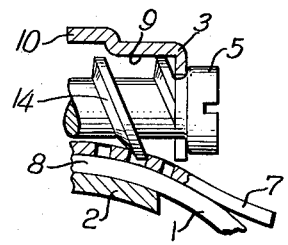

FIG. 1 is a longitudinal sectional view of a hose clamp constructed in accordance with the invention, FIG. 2 is a cross-section taken along the line II—II of FIG. 1 and FIG. 3 is a longitudinal sectional view of the right hand end, as seen in FIG. 1 of a hose clamp having a modified structure.

Referring to the drawing, numeral 1 denotes one end of a flexible steel band or strip which is suitably fastened, such as by spot welding, to the bottom part 2 of a casing the top part of which is indicated at 3. Mounted for turning in the top part 3 is a screw 4 the thread of which has a comparatively great pitch. As will be seen from FIG. 1, the right-hand end of the thread is located at a small distince from the head 5 of the screw. Between the head 5 and the end of the thread the screw has a circular shallow groove or neck 6. This groove receives the edges of a recess in the right-hand end wall of the top part 3 of the casing, this recess being downwardly open so as to permit insertion of the screw from below. The width of the recess is slightly smaller than the core diameter of the screw. Due to the arrangement described, the screw 4 can not be unintentionally screwed out of the casing.

Near its other end 7 the steel strip has diagrammatically indicated helical recesses 8 adapted to be engaged by the thread of the screw 4.

The end portions of the top part 3 of the casing form semi-cylindrical supports 9 for the end portions of the screw. The length of each support is slightly greater than the pitch of the thread, and the curvature of the supports equals half the outside diameter of the screw. The central portion 10 of the top part 3 is located at a higher level than the end portions, but forms lateral supports for the screw, as will be seen from FIG. 2 which also shows how the bottom part 2 is riveted to the top part 3.

At its free end the screw 4 has a journal 11 which enters a corresponding recess in the left-hand end wall of the top part 3. This journal may be omitted, in which case the left-hand end wall may be unperforated.

In the assembled position of the clamp, the screw 4 will be pressed against the semi-cylindrical supports 9, thus providing a certain frictional resistance to turning movement. Since this frictional resistance acts on the top of the thread, that is, at the greatest diameter of the screw, the moment or torque due to the frictional resistance will be comparatively great even in case of moderate pressures. Since the pressure exerted by the steel strip acts on the central portion of the screw, whereas the reactional forces act on the ends of the screw, the device as a whole will be somewhat resilient, resulting in a very uniform frictional resistance. The enlarged central portion 10 of the top part 3 also acts to reinforce the top part and counteracts excessive resiliency.

It will be seen from FIG. 1 that the thread of the screw extends substantially throughout the distance between the end walls of the top part 3. Since the tension on the steel strip always keeps the screw in abutment with the left-hand end wall of the top part 3, as viewed in FIG. 1, the groove or neck 6 may be omitted and the recess in the right-hand end wall may have a width which substantially equals the core diameter of the screw as shown in FIG. 3. This recess may even advantageously be still wider as it does not form a bearing for the screw, in which case the head 5 may smoothly merge into the core of the screw to eliminate any risk of the head getting broken from the screw.

While a preferred embodiment of the invention has been described above, it will be understood that the invention is not limited thereto since it may be otherwise embodied within the scope of the following claims.

What I claim is:

1. A hose clamp comprising a casing having top and bottom parts, a screw rotatably mounted longitudinally in said casing, the top part of said casing having top and side walls, and a metallic strip having one of its ends fastened to the casing bottom part and having near its other end recesses engageable by the thread of the screw, the top part of said casing having semi-cylindrical portions the top and side walls surfaces of which frictionally engage the tops of the screw threads over about half of the outer periphery thereof and a central portion having a recess in the top wall thereof opposite the point of threaded engagement of the screw with the metallic strip so that only the side wall surfaces of the casing top part central portion engage the tops of the screw threads.

2. A hose clamp as defined in claim 1 wherein the length of each semi-cylindrical portion is at least as great as the pitch of the screw thread.

3. Apparatus as defined in claim 2 wherein said casing top part has an end wall containing an opening through which one end of said screw extends, the width of said opening being equal to the core diameter of said screw.

4. Apparatus as defined in claim 2 wherein said casing top part has an end wall containing an opening through which one end of said screw extends, the width of said opening being slightly smaller than the core diameter of the screw, said screw having a neck portion of smaller diameter than said core diameter, the edges of the end wall opening bearing against the periphery of said screw neck portion.

References Cited in the file of this patent
FOREIGN PATENTS
765,243    Great Britain _____ Jan. 9, 1957